United States Patent
Gharapetian et al.

(10) Patent No.: US 7,642,314 B2
(45) Date of Patent: Jan. 5, 2010

(54) EMULSION POLYMERS HAVING MULTIMODAL MOLECULAR WEIGHT DISTRIBUTIONS

(75) Inventors: Hrire Gharapetian, Ridgewood, NJ (US); Robert Sheerin, North Caldwell, NJ (US); Navin Tilara, Roseland, NJ (US)

(73) Assignee: Columbia Insurance Company, Omaha, NE (US)

( * ) Notice: Subject to any disclaimer, the term of this patent is extended or adjusted under 35 U.S.C. 154(b) by 671 days.

(21) Appl. No.: 11/323,621

(22) Filed: Dec. 30, 2005

(65) Prior Publication Data

US 2007/0155892 A1    Jul. 5, 2007

(51) Int. Cl.
C08D 5/02        (2006.01)
A61K 9/16       (2006.01)
C08F 20/06     (2006.01)

(52) U.S. Cl. .................... 524/556; 524/543; 526/317.1; 526/319

(58) Field of Classification Search ................. 524/556, 524/543; 526/317, 319, 317.1
See application file for complete search history.

(56) References Cited

U.S. PATENT DOCUMENTS

| | | | |
|---|---|---|---|
| 3,887,610 A | 6/1975 | Kober | |
| 4,062,823 A | 12/1977 | Cheung | |
| 4,722,965 A | 2/1988 | Wong et al. | |
| 4,780,503 A | 10/1988 | Mallya | |
| 4,877,853 A | 10/1989 | Siol | |
| 5,202,378 A | 4/1993 | Barnett | |
| 5,444,140 A | 8/1995 | Paine | |
| 5,534,310 A | 7/1996 | Rokowski | |
| 5,536,615 A * | 7/1996 | Hopper et al. | ......... 430/137.14 |
| 5,543,310 A | 8/1996 | Kayane et al. | |
| 5,548,043 A | 8/1996 | Saban et al. | |
| 5,726,259 A | 3/1998 | Hayes et al. | |
| 5,738,964 A * | 4/1998 | Uchida et al. | ............ 430/109.3 |
| 5,990,228 A | 11/1999 | Eichmann et al. | |
| 6,022,925 A | 2/2000 | Tomko et al. | |
| 6,127,455 A | 10/2000 | Dohard | |
| 6,177,493 B1 | 1/2001 | Maver | |
| 6,258,888 B1 | 7/2001 | Peters | |
| 6,268,420 B1 | 7/2001 | Maver | |
| 6,417,269 B1 | 7/2002 | Murray | |
| 6,509,064 B2 | 1/2003 | Gebhart et al. | |
| 6,660,801 B1 | 12/2003 | Gebhard et al. | |
| 6,663,917 B2 | 12/2003 | Gebhart et al. | |
| 6,664,327 B2 | 12/2003 | Daisey | |
| 6,673,451 B2 | 1/2004 | Bardman | |
| 6,723,779 B2 | 4/2004 | Drujon et al. | |
| 6,753,355 B2 | 6/2004 | Stollmaier | |
| 6,846,867 B2 | 1/2005 | Gebhard et al. | |
| 6,852,812 B2 | 2/2005 | Betremieux | |
| 2002/0064600 A1 | 5/2002 | Gebhart et al. | |
| 2002/0107322 A1 | 8/2002 | Gebhard et al. | |
| 2002/0169247 A1 | 11/2002 | Kuo | |
| 2003/0157258 A1 | 8/2003 | Gebhart et al. | |
| 2004/0013809 A1 | 1/2004 | Gebhard et al. | |
| 2004/0072945 A1 | 4/2004 | Chen | |
| 2005/0014883 A1 | 1/2005 | Blankenship et al. | |
| 2005/0085575 A1 | 4/2005 | Gebhard et al. | |

FOREIGN PATENT DOCUMENTS

| | | |
|---|---|---|
| EP | 239213 | 9/1987 |
| EP | 0614919 A1 | 9/1994 |
| EP | 0697417 B1 | 5/1999 |
| EP | 0658608 B1 | 5/2000 |
| EP | 1240223 B1 | 9/2002 |
| EP | 01243643 A3 | 9/2002 |
| SU | 587125 | 1/1978 |
| WO | WO 94/04581 | 3/1994 |
| WO | WO 0226873 A2 | 4/2002 |

OTHER PUBLICATIONS

Kaminski et al. "Producing Bimodal Molecular Weight Distribution Polymer Resins Using Living and Conventional Free-Radical Polymerization", Ind. Eng. Chem. Res., 2005, 44(8), 2568-2578.*

Lieberman, et al. *Emulsion Polymerization Process with Delayed Addition of Chain Transfer Agent*. Xerox Disclosure Journal, vol. 2, No. 5, Sep./Oct. 1997, pp. 259-260. (Abstract Only).

Grushkin, *Plasticized Bimodal Styrene-Acrylate Resin for SCD and TCD Developers*. Xerox Disclosure Journal, vol. 19, No. 2, Mar./Apr. 1994, pp. 199-200. (Abstract Only).

Chu, et al. *Study of Poly(St/BA/MAA) Copolymer Latexes with Bimodal Particle Size Distribution*. Polym. Adv. Technol., vol. 9, No. 12, 1998, pp. 851-857. (Abstract Only).

(Continued)

*Primary Examiner*—David Wu
*Assistant Examiner*—Michael M Bernshteyn
(74) *Attorney, Agent, or Firm*—The H.T. Than Law Group

(57) ABSTRACT

The present invention relates to polymers polymerized sequentially or in stages and having multimodal molecular weight distributions. The polymers according to the invention can advantageously be present in aqueous emulsion or latex form and can advantageously be used in paint compositions and other coating applications.

25 Claims, No Drawings

OTHER PUBLICATIONS

Boutti, et al. *High Solids Content Emulsion Polymerisation without Intermediate Seeds; In Situ Generation of Bimodal Latice;s Polymers in Dispersed Media- Colloids: From Preparation to Application.* Polymer, vol. 46(4), 2005, pp. 1211-1222. (Abstract Only).

Ozdeger, *Emulsion Polymerizations of Styrene and N-Butyl Acrylate in an Automated Reaction Calorimeter (Nucleation).* PhD Dissertation (Lehigh University), Dissertations Abstracts International, vol. 5804B, p. 1906. (Abstract Only).

Betremieux, et al. *High Solids Content Emulsions; IV Improved Strategies for Producing Concentrated Latices.* Journal of Applied Polymer Science, vol. 84, No. 10, Jun. 2002, pp. 1935-1948. (Abstract Only).

Ford, et al. *High Molecular Weight Poly(alpha-methylstyrene) Formed by Free Radical Polymerization in Emulsions.* Journal of Polymer Science, vol. 39, No. 4, 2001, pp. 525-529. (Abstract Only).

Capek, *Microemulsion Polymerization of Butyl Acrylate in the Presence of Polymeric Hydrophobes.* Polymer Journal, vol. 32, No. 8, 2000, pp. 670-675. (Abstract Only).

Ozdeger, *Role of the Nonionic Surfactant Triton X-405 in Emulsion Polymerization; Homopolymerization of Styrene.* Journal of Polymer Science, Part A: Polymer Chemistry, vol. 35, No. 17, Dec. 1997, pp. 3813-3825. (Abstract Only).

Full, *Microemulsion Polymerization of Styrene: the Effect of Salt and Structure.* Macromolecules, vol. 29, No. 8, Apr. 1996, pp. 2765-2775. (Abstract Only).

*Full Public Report: Component of Sipomer WAM II.* National Industrial Chemicals Notification and Assessment Scheme, Sep. 1999, National Occupational Health and Safety Commission; Department of the Environment; Department of Health and Family Services, Australia.

Brown and Hoy, *Method for Measuring Chalk Adhesion of Latex Paints.* Journal of Coating Technology, vol. 49, No. 625, Feb. 1977, pp. 37-47. (Abstract Only).

Madson, *Zinc Oxide and Rutile-Anatase Chalking Study in White, Exterior, Latex House Paints.* Journal of Paint Technology, vol. 43, No. 561, Oct. 1971, pp. 54-59. (Abstract Only).

Henderson, et al. *Advances in Waterborne Chalk Adhesion Technology.* Conference Paper, Proceedings of the 79th Annual Meeting of the FSCT, Atlanta, GA, Nov. 5-7, 2001. (Abstract Only).

Nielsen and Sola, *Improving Adhesion of Emulsion Paints.* Paint & Ink Int., vol. 11, No. 6, Nov./Dec. 1998, pp. 18-19. (Abstract Only).

Washburne, et al. *Refinishing Residential Siding.* Resin Rev., vol. 16, No. 4, 1986, pp. 24-31. (Abstract Only).

Freimiller and Gozdan, *Repainting Prefinished Siding.* Res. Review, vol. 33, No. 1, 1983, pp. 9-12. (Abstract Only).

Brandes, Internal Wall Paints for Historical Buildings. Applica, vol. 109, No. 4, 2002, pp. 24-27. (Abstract Only).

LeSota, et al. *Hydrophobically-Modified Alkali-Soluble Emulsions (HASE) as Thickeners for Exterior Latex Paints.* Journal of Coatings Technology, vol. 61, No. 777, 1989, pp. 135-138. (Abstract Only).

*What Can be Expected from Siliconised Alkyd Resin Paints.* Mappe, vol. 90, No. 6, 1976, pp. 360-362. (Abstract Only).

\* cited by examiner

EMULSION POLYMERS HAVING MULTIMODAL MOLECULAR WEIGHT DISTRIBUTIONS

FIELD OF THE INVENTION

The present invention relates to a latex containing polymer particles that are polymerized in at least two stages and that have a multimodal molecular weight distribution, as well as methods for making same. The latex containing the polymers according to the invention can advantageously be used in paint compositions and architectural coating applications.

BACKGROUND OF THE INVENTION

Acrylic latexes are used in many products, and are known. Their ingredients, synthesis methods, and results characterization can have an impact on their particular end-use, particularly in the area of coating compositions such as paints and stains. The patent literature discloses latex compositions of acrylic polymers and copolymers, many for use in the coatings art.

For example, U.S. Pat. No. 5,990,228 and U.S. Patent Application Publication No. 2005/0014883 A1 both disclose providing pre-polymerized "seed" latex particles to a reaction vessel and only then further conducting a polymerization in their presence. As disclosed in the '228 patent, aqueous coating compositions containing at least two polymer components provide adhesion and improved durability, as measured in dried coatings made from the aqueous compositions by improving gloss retention or dirt pickup resistance. Specifically, Comparative Example 1 in the '228 patent discloses the use of a pre-polymerized latex core of 60 nm particulate poly(butyl acrylate-co-methyl methacrylate-co-methacrylic acid), upon which was further polymerized two layers of poly(butyl acrylate-co-methyl methacrylate-co-acrylic acid) of the same composition. Furthermore, all of the Examples in this patent disclose compositions that are polymerized in the presence of these pre-formed 60 nm core latex particles. In addition, the '228 patent discloses acrylic copolymers having very low proportions of acid monomers (e.g., methacrylic acid and acrylic acid).

In coating applications, the acrylic latexes are sometimes reacted with a crosslinking component, such as an epoxy compound, to form a crosslinked coating. Because epoxies are reactive with many different types of functional groups, such as hydroxyls, carboxylic acids, amines, etc., there has been a wide variety of different compositions of acrylic monomers used to attain various properties, such as increased latex stability, acceptable curing behavior with epoxies, etc. Several publications in the patent literature focus on core-shell type acrylic particles having hydroxyl functionality specifically in the core of the particles. Most of these publications also require a substantial glass transition temperature difference between the core polymer and the shell polymer.

For example, International Publication No. WO 94/04581 discloses waterborne latices containing core-shell acrylic particles that are adapted for spray application to form coatings that impart impact resistance, sag resistance, and solvent popping resistance. This publication teaches that the core contains 50-90 wt % acrylic and methacrylic monomers and 1-20 wt % hydroxy-functional monomers so as to form a polymer having a $T_g$ below 0° C. This publication also teaches that the shell contains 40-90 wt % acrylic and methacrylic monomers, 5-20 wt % acid-containing monomers, and 1-20 wt % hydroxy-functional monomers so as to form a polymer having a $T_g$ above 20° C.

In addition, European Patent Application No. EP 0 614 919 A1 describes a latex composition containing core-shell type polymer particles in which the core is made from 50-90 wt % $C_1$-$C_4$ alkanoate monomers and 10-50 wt % monomers being vinyl esters of tertiary saturated carboxylic acids so as to form a polymer having a $T_g$ of at least 10° C., and in which the shell is made from 10-50 wt % $C_1$-$C_4$ alkanoate monomers and 50-90 wt % monomers being vinyl esters of tertiary saturated carboxylic acids so as to form a polymer having a $T_g$ below 10° C. In addition, the application requires a difference between the $T_g$ values of the core and the shell of at least 5° C.

Further, U.S. Pat. No. 6,723,779 describes a low-temperature film-forming latex based on hydrophobic polymers in which crosslinking monomers, such as dienes, divinyl acrylates, polyvinyl compounds, and the like, are used so that the composition is self-curing. This patent also teaches that the latex polymers have a core-shell morphology in which 70-90 wt % of the particle is the core polymer having a $T_g$ below 20° C. and 10-30 wt % of the particle is the shell polymer having a $T_g$ above 50° C.

As shown, for example, in European Patent Application No. EP 0 614 919 A1 and in U.S. Pat. No. 6,723,779 above, other ways to attain various properties, such as stability, corrosion resistance, weatherability, and the like, in the latex particles and the coatings made therefrom include copolymerizing the acrylic monomers with different types of comonomers. One such popular comonomer is acrylamide. However, the use of acrylamides may cause health and disposal issues, and it is desirable to find other ways to improve these properties without increasing the toxicity of the latex particles and the products made therefrom.

Another approach to controlling molecular weight is to establish a living ionic polymerization, as disclosed in U.S. Pat. No. 5,548,043. Although living polymerizations are typically only used to polymerize vinyl monomers having an increased ability to delocalize the ionic charge on the living end of the polymerizing molecule (e.g., conjugated dienes and/or styrenic monomers), this patent generally teaches the formation of many different types of low-melt toner polymer resins that have bimodal molecular weight distributions. The bimodality disclosed in the aforementioned patent is accomplished by selective termination of the living polymerization, e.g., by introducing air, resulting in a high and a low molecular weight peak. However, the living ionic polymerization approach is not typically viable for predominantly acrylic-based polymers and is typically not performed in an emulsion or latex medium.

Thus, there remains a need for a multimodal acrylic-based polymer latex which exhibits desirable performance properties without increased toxicity.

BRIEF SUMMARY OF THE INVENTION

One aspect of the invention relates to an acrylic latex composition comprising polymer particles that have a multimodal molecular weight distribution comprising at least a first, distinct, higher molecular weight peak and a second, distinct, lower molecular weight peak. Advantageously, the polymer particles can have a total number average molecular weight of not more than about 60,000 Daltons, a total weight average molecular weight of not less than about 150,000 Daltons, and a polydispersity of at least about 3.1. Also advantageously, (a) the first, distinct, higher molecular weight peak can have a peak molecular weight from about 175,000 Daltons to about 400,000 Daltons; (b) the second, distinct, lower molecular weight peak can have a peak molecular weight from about 15,000 Daltons to about 60,000 Daltons; (c) the ratio of the peak molecular weights between the first peak and the second peak can be from about 3:1 to about 30:1; and (d) the polymer particles (i) can be substantially free from hydroxy-functional monomer repeat units and conjugated diene monomer repeat units, (ii) can comprise substantially acrylic monomers, or (iii) both (i) and (ii).

Another aspect of the invention relates to a method for forming an acrylic polymer particulate latex having a multimodal molecular weight distribution that exhibits at least a first, distinct, higher molecular weight peak and a second, distinct, lower molecular weight peak. The method can advantageously comprise the steps of:

(i) providing an aqueous emulsion in a reaction vessel;

(ii) adding a first set of monomers to the aqueous emulsion to form a monomer emulsion;

(iii) adding a first initiator solution to the initiating emulsion to form a polymerizable emulsion;

(iv) sequentially following step (i) or step (iii), optionally co-adding an intervening set of monomers, a polymer molecular weight control agent solution, and an intervening initiator solution to the polymerizable emulsion;

(v) sequentially following step (iv), if present, otherwise following step (i) or step (iii), co-adding a second set of monomers, a polymer molecular weight control agent solution, and a second initiator solution to the polymerizable emulsion;

(vi) sequentially polymerizing the first set of monomers and the second set of monomers, with the optional intervening set of monomers being polymerized therebetween, in the presence of a polymer molecular weight control agent solution to form a sequentially polymerized emulsion comprising the multimodal molecular weight distribution;

(vii) optionally adding water to rinse the sequentially polymerized emulsion;

(viii) optionally adding a chaser solution to the sequentially polymerized emulsion; and (ix) optionally adding an additive solution to help stabilize the sequentially polymerized emulsion.

The numbering of the method steps above should be construed only to enumerate each step separately and not to imply any necessary numerical progression of steps or order not otherwise specifically stated herein. In a preferred embodiment, the sequential adding steps for the second set of monomers and for the optional intervening set of monomers are performed either (a) immediately after the step of adding the first set of monomers, the optional intervening set of monomers, or both, or (b) after a period of time has elapsed, but without manipulating, isolating, purifying, or separating any polymerized particle from the polymerizable emulsion. In another preferred embodiment, the polymer particles are substantially free from pre-polymerized polymer particles that were not formed during the steps of adding any of the sets of monomers.

DETAILED DESCRIPTION OF THE INVENTION

One aspect of the present invention relates to a latex containing polymer particles that are sequentially polymerized and that have a multimodal molecular weight distribution. In one preferred embodiment, the polymer particles in the latex have a bimodal or trimodal molecular weight distribution.

Multimodal molecular weight distributions can be engineered in polymers in many ways. One such way includes introducing a chain transfer agent at some point during the polymerization process. For addition-type polymerizations (such as for making acrylic-based polymers), because propagation of a polymer chain typically occurs much faster than chain initiation and chain termination steps, not only can polymers of significant molecular weight form even at relatively low monomer conversions, but also a significant amount of unreacted monomer can be present even at relatively high monomer conversions. This means that part of the molecular weight distribution of the resulting polymer is typically occurring over a wide time window during the reaction process. As a result, a polymer chemist can take the opportunity during the polymerization to alter the molecular weight of some of the polymer chains before they form, for example, by adding a chain transfer agent at some part of the way through the polymerization process.

A chain transfer agent can operate to control molecular weight by effecting a termination of one propagating polymer chain and an initiation of another polymer chain, typically so that the average molecular weight of the polymer chains is lower than would have occurred without the chain transfer agent. Also typically, the magnitude of the molecular weight decrease can change (usually, but not always) in relative proportion to the amount of chain transfer agent added. This generally means that a polymer chemist desiring a lower molecular weight adds more chain transfer agent, and that a polymer chemist desiring a higher molecular weight adds less chain transfer agent, with the molecular weight obtained without any chain transfer agent generally being the upper bound for molecular weight.

In addition, the relative proportion of lower molecular weight and higher molecular weight material can be controlled by the timing of the addition of the chain transfer agent. For instance, if the chain transfer agent is added relatively early in the polymerization, then the resulting polymer should generally exhibit predominantly a lower average molecular weight with a relatively small fraction of higher molecular weight material. Conversely, therefore, if the chain transfer agent is added relatively late in the polymerization, then the resulting polymer should generally exhibit predominantly a higher average molecular weight with a relatively small fraction of lower molecular weight material.

One of the benefits of lower molecular weight chains in the acrylic latex polymer particles can be improved substrate adhesion, whereas one of the benefits of higher molecular weight chains in the acrylic latex polymer particles can be increased physical/mechanical strength. Combining these benefits by creating a multimodal molecular weight distribution can therefore be desirable.

The polymer particles according to the invention are typically polymerized in a latex system comprising water, surfactant, the desired monomer(s), an initiator, a polymer molecular weight control agent, optionally an organic solvent, optionally a pH adjustor, optionally a chaser agent, and optionally a preservative, which can be added at various times.

Examples of surfactants useful in the compositions according to the invention can include, but are not limited to, nonionic and/or anionic surfactants such as ammonium nonoxynol-4 sulfate, nonylphenol (10) ethoxylate, nonylphenol (~10 mol %) ethoxylate, nonylphenol (~40 mol %) ethoxylate, octylphenol (~40 mol %) ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, those sold under the tradename Triton™ (e.g., QS series, CF series, X series, and the like) from Dow Chemical, those sold under the tradename Rhodapon™ from Rhodia, those sold under the tradename Rhodapex™ from Rhodia, those sold under the tradename Rhodacal™ from Rhodia, those sold under the tradename Rhodafac™ from Rhodia, and the like, and combinations thereof.

Examples of initiators and chaser solutions useful in the compositions according to the invention can include, but are not limited to, ammonium persulfate, sodium persulfate, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjustor, if desired to stabilize the emulsion.

Examples of pH adjustors useful in the compositions according to the invention can include, but are not limited to, ammonium hydroxide, sodium hydroxide, sodium carbonate, sodium bicarbonate, potassium hydroxide, potassium carbonate, potassium bicarbonate, ammonia, and the like, and combinations thereof. In certain cases, compounds that qualify as pH adjustors can be added for purposes other than adjusting pH, e.g., emulsion stabilization, and yet are still characterized herein as pH adjustors.

Examples of polymer molecular weight control agents include, but are not limited to, chain transfer agents, e.g., alkyl mercapto-esters such as isooctyl mercaptopropionate.

Examples of biocides/preservatives useful in the compositions according to the invention can include, but are not limited to, hydroxy-functional aza-dioxabicyclo compounds such as those commercially available from ISP under the tradename Nuosept™ 95.

The molecular weight distribution of the polymer particles can be controlled using the polymer molecular weight control agent discussed above. In a preferred embodiment, the polymer particles exhibit a bimodal or trimodal polymer molecular weight distribution. In the embodiments where the polymer particles exhibit a bimodal polymeric molecular weight distribution, there will necessarily be a higher molecular weight peak and a lower molecular weight peak.

In a preferred embodiment where the polymer particles exhibit a bimodal polymeric molecular weight distribution, the peak molecular weight of the lower molecular weight peak ($M_p^L$) can be from about 15,000 Daltons to about 60,000 Daltons, preferably from about 20,000 Daltons to about 50,000 Daltons, for example from about 25,000 Daltons to about 40,000 Daltons. In another preferred embodiment where the polymer particles exhibit a bimodal polymeric molecular weight distribution, the peak molecular weight of the higher molecular weight peak ($M_p^H$) can be from about 175,000 Daltons to about 400,000 Daltons, preferably from about 200,000 Daltons to about 375,000 Daltons, for example from about 225,000 Daltons to about 350,000 Daltons or from about 240,000 Daltons to about 325,000 Daltons. In another preferred embodiment where the polymer particles exhibit a bimodal polymeric molecular weight distribution, the ratio of the peak molecular weights of the higher molecular weight peak to the lower molecular weight ($M_p^H/M_p^L$) can be from about 3:1 to about 30:1, preferably from about 4:1 to about 20:1, more preferably from about 5:1 to about 15:1, for example from about 6:1 to about 10:1.

In one preferred embodiment, the polymer particles exhibit a total number average molecular weight ($M_n$) of not more than about 60,000 Daltons, preferably not more than about 50,0000 Daltons, more preferably not more than about 45,000 Daltons, most preferably not more than about 40,000 Daltons. In another preferred embodiment, the polymer particles exhibit a total weight average molecular weight ($M_w$) of not less than about 150,000 Daltons, preferably not less than about 170,000 Daltons, for example not less than about 200, 000 Daltons or not less than about 220,000 Daltons. In another preferred embodiment, the polymer particles exhibit a total polydispersity ($M_w/M_n$) of at least about 3.1, preferably at least about 4, more preferably at least about 5, for example from about 5 to about 10 or from about 6 to about 9.

In the latex of the present invention, the polymer particles are made from a mixture of monomers containing both pendant ester groups and pendant functional groups. The pendant functional groups can be useful for later coalescence and crosslinking of the polymer particles with a crosslinking agent, if desired. As a common functional group is a carboxylic acid group, the content of the functional group-containing monomers herein can be described as an acid monomer content.

In one embodiment, the polymer particles can have an average acid monomer content of less than about 10% by weight, preferably less than about 8%, more preferably from about 0.1% to about 7%, for example from about 0.2% to about 6%. Although the acid content is described herein in terms of weight percent of acid monomer, acid content can be quantified in many ways, e.g., acid number.

In a preferred embodiment, the monomers polymerized to form the polymer particles can be similar in chemistry but exhibit different contents of acid monomers. In this embodiment, the glass transition temperature of the polymer particles is typically above about −20° C. In a preferred embodiment, the $T_g$ values of the polymer particles can fall within the range from about −10° C. to about 50° C., preferably from about −5° C. to about 40° C.

In one embodiment, the $T_g$ values for the polymer particles can preferably be measured using conventional tools and techniques known to those of skill in the art, e.g., differential scanning calorimetry (DSC), dynamic mechanical thermal analysis (DMTA), or the like, or a combination thereof. In another less preferred embodiment, the $T_g$ values for the polymer particles can be completely calculated by applying Fox's law to known $T_g$ values, e.g., from any edition of the *Polymer Handbook* such as the $3^{rd}$ ed. (1989), of the homopolymers corresponding to each of the monomers used and their respective weight ratios. For descriptions of this latter method, see, e.g., U.S. Pat. No. 6,723,779 and/or International Publication No. WO 94/04581, the disclosures of both of which are incorporated herein by reference in their entireties.

When using DSC to probe the temperature-related polymer transitions of a sample of about 5 mg at a ramp rate from about 5° C. min to about 10° C./min, the breadth of the resultant glass transition range of a multimodal polymer according to the invention can advantageously be broader than the glass transition temperature of a corresponding monomodal polymer. Nevertheless, in most embodiments, the glass transition temperature (e.g., as reflected in the DSC inflection point) of a multimodal polymer according to the invention can be within about 10° C. of the glass transition temperature of a corresponding monomodal polymer, preferably within about 7° C., for example within about 5° C. In a preferred embodiment, the breadth of the glass transition temperature range of a multimodal polymer according to the invention can be at least about 17° C., preferably at least about 21° C., for example at least about 25° C. In another preferred embodiment, the breadth of the glass transition temperature range of a multimodal polymer according to the invention can be at least about 5° C. broader, preferably at least about 10° C. broader, for example at least about 15° C. broader than the glass transition temperature range of a corresponding monomodal polymer.

Many different functional groups may be suitable as pendant groups on the polymers according to the invention. Although the acrylic polymers according to the invention have been described in terms of their acid content, it should be understood that the term "acid content" should include not merely the content of carboxylic acid-containing monomers, but the combined content of any monomers having pendant groups that are capable of reacting with crosslinking agents. Further, as used herein, the terms "polymer" and "polymers" are used to refer to oligomers, adducts, homopolymers, random copolymers, statistical copolymers, alternating copolymers, periodic copolymer, bipolymers, terpolymers, quaterpolymers, other forms of copolymers, substituted derivatives thereof, and combinations of two or more thereof. Such polymers can be linear, branched, hyper-branched, crosslinked, block, di-block, multi-block, graft, isotactic, syndiotactic, stereoregular, atactic, gradient, multi-arm star, comb, dendritic, and/or any combination thereof.

Examples of polymer repeat units having functional groups can include, but are not limited to, acrylic acid, ionic acrylate salts, alkacrylic acids, ionic alkacrylate salts, haloacrylic acids, ionic haloacrylate salts, polymerizable anhydrides such as maleic anhydride, acrylamide, alkacrylamides, monoalkyl acrylamides, monoalkyl alkacrylamides, alkacrylamidoalkyl ethyleneureas such as those sold under the tradename Sipomer™ WAM from Rhodia, alkenyloxyamidoalkyl ethyleneureas such as those sold under the tradename Sipomer™ WAM from Rhodia, vinyl dicarboxylic organic acids (e.g., itaconic acid, glutaconic acid, maleic acid, angelic acid, fumaric acid, tiglic acid, and the like), monoalkyl esters of vinyl dicarboxylic organic acids (e.g., methyl maleate, ethyl fumarate, and the like), monoisopropenyl esters of saturated, vinyl dicarboxylic organic acids, and the like, and copolymers and combinations thereof.

As used herein, the prefix "alk" before an ethylenically unsaturated monomer should be understood to indicate a $C_1$-$C_6$ hydrocarbon side group attached to either carbon of the olefinic pendant group, though it usually refers to a group attached to the same carbon as the olefinic pendant group. For example, the most basic alkacrylic acid is methacrylic acid. However, if the "alk" group is on the vinyl carbon not containing the pendant carboxylic acid, then a methacrylic acid becomes crotonic acid, which is contemplated as an alkacrylic acid, as defined herein. Another example includes tiglic acid (i.e., 2-butene-2-carboxylic acid), which is an alkacrylic acid containing two "alk" groups, with one methyl group attached to each vinyl carbon. As used herein, the term "alkyl" should be understood to mean an aliphatic $C_1$-$C_{18}$ hydrocarbon moiety. For instance, the monomer ethyl methacrylate has a methyl group attached as an ester to the pendant carboxylate group and an ethyl group attached to the same carbon of the vinyl moiety as the pendant carboxylate (i.e., $CH_2=C(CH_2CH_3)-C(=O)O(CH_3)$). As used herein, "alkenyl" should be understood to mean a $C_2$-$C_{18}$ hydrocarbon moiety having a single double bond, preferably a terminal double bond.

In the embodiments where the polymer repeat units include ionic salts, their counterions can include, but are not limited to, sodium, potassium, lithium, copper, silver, ammonium, tetraalkyl ammonium, alkyl pyridinium ions such as N-methyl pyridinium, tetraalkyl phosphonium ions, tetraaryl phosphonium ions, aralkyl phosphonium ions such as methyltriphenylphosphonium and methyltriphenoxyphosphonium, trialkylsulfonium ions such as trimethylsulfonium, aralkyl sulfonium ions, trialkylsulfoxonium ions such as trimethylsulfoxonium, aralkyl sulfoxonium ions, and the like, and combinations thereof. As used herein, the term "aryl" should be understood to mean an aromatic $C_5$-$C_{18}$ moiety, and the term "aralkyl" should be understood to mean a moiety that is partially aryl and partially alkyl.

In one embodiment, at least the core monomers, and typically also the shell monomers, can be substantially free from hydroxy-functional pendant groups such as, but not limited to, those in hydroxyalkyl acrylates, hydroxyalkyl alkacrylates, vinyl phenols, hydroxyalkyl vinyl benzenes, only partially esterified acrylate esters of alkylene glycols, only partially esterified acrylate esters of non-polymeric polyhydroxy compounds like glycerol, only partially esterified acrylate esters of polymeric polyhydroxy compounds, and the like. In another embodiment, both the core monomers and the shell monomers can be substantially free from conjugated diene monomers such as, but not limited to, butadienes, hexadienes, hexatrienes, octadienes, octatrienes, octatetrenes, as well as hydrocarbon analogs thereof, substituted halo- and/or cyano-derivatives thereof, and the like, and a combination thereof. As used herein, the terms "substantially no" and "substantially free from", referring to a component in a composition and unless otherwise specified, mean that the composition comprises not more than about 1 wt %, preferably not more than about 0.5 wt %, more preferably not more than about 0.1 wt %, most preferably not more than about 0.02 wt %, or in some cases completely none (about 0%), of the component.

Optionally, in addition to the functionality for crosslinking, the polymers according to the invention can also comprise diluent monomers or repeat units that contain pendant groups that do not typically react with crosslinking agents. Examples of such diluent monomers can include, but are not limited to, alkyl acrylates, alkyl alkacrylates, alkyl esters of vinyl monocarboxylic organic acids other than acrylates and alkacrylates (e.g., ethyl tiglate, methyl crotonate, and the like), dialkyl esters of vinyl dicarboxylic acids, styrene, alkylstyrenes (e.g., a-ethylstyrene, a-methylstyrene, vinyl toluene, 2,4-dimethylstyrene, 4-t-butylstyrene, and the like), halostyrenes (e.g., α-bromostyrene, 2,6-dichlorostyrene, and the like), isopropenyl esters of saturated, monocarboxylic organic acids (e.g., isopropenyl acetate, isopropenyl isobutyrate, and the like), monoisopropenyl monoalkyl esters of saturated, dicarboxylic organic acids (e.g., isopropenyl alkyl oxalate, isopropenyl alkyl succinate, and the like), vinyl carboxylate alkyl ethers (e.g., vinyl acetate, vinyl propionate, vinyl butyrates, vinyl benzoates, halo-substituted versions thereof such as vinyl chloroacetate, and the like), vinyl alkyl ethers, acrylonitrile, alkacrylonitriles, dialkyl acrylamides, dialkyl alkacrylamides, allyl compounds (e.g., allyl chloride, allyl esters of saturated, monocarboxylic acids, allyl alkyl esters of saturated, dicarboxylic organic acids, and the like), and the like, and combinations thereof. Preferred diluent monomers include, but are not limited to, $C_1$-$C_8$ alkyl acrylates, $C_1$-$C_8$ alkyl $C_1$-$C_2$ alkacrylates, styrene, $C_1$-$C_4$ alkylstyrenes, vinyl acetate, and combinations thereof.

In one preferred embodiment, the polymers according to the invention can be substantially acrylic. As used herein, the term "acrylic" refers to (co)polymer compositions made from monomers selected from the group consisting of alkyl acrylates, alkyl alkacrylates, acrylic acid, ionic acrylate salts, alkacrylic acids, ionic alkacrylate salts, acrylamide, alkacrylamides, monoalkyl acrylamides, monoalkyl alkacrylamides, acrylonitrile, alkacrylonitriles, substituted versions thereof (e.g., hydroxyalkyl acrylates, hydroxyalkyl alkacrylates, alkacrylamidoalkyl ethyleneureas, alkenyloxyamidoalkyl ethyleneureas, and the like), and the like, and combinations thereof. As used herein, the term "substantially," at least with regard to a component in a composition, means that the composition contains at least about 90% by weight of that component, preferably at least about 95% by weight of that component, more preferably at least about 97% by weight of that component, most preferably at least about 99% by weight of that component, in some cases at least about 99.9% by weight of that component, or completely comprises (about 100% by weight of) that component.

Acrylic latex copolymers containing acrylonitrile are known in the art to improve certain physical properties as compared to non-acrylonitrile-containing acrylics, but can significantly increase cost and can introduce undesirable environmental issues. Thus, in one embodiment, the diluent monomers specifically do not include acrylonitrile and alkacrylonitriles. It has been discovered that core-shell acrylic polymers according to the invention can have comparable, or even superior, properties to (alk)acrylonitrile-containing acrylics with relatively little, if any, increased cost/environmental impact.

It is known in the prior art to form core-shell-type acrylic latex polymers by pre-polymerizing monomers into core particles, and then manipulating, isolating, purifying, and/or separating the core particles before forming an acrylic shell around the core particles discussed above. See, e.g., U.S. Pat. No. 5,990,228, Comparative Example 1 at columns 4-5 (specifically column 4, line 43), for the use of a pre-formed core. All of the Examples in the '228 patent further disclose compositions that are polymerized in the presence of this pre-formed core. The latex polymers according to the invention, in a preferred embodiment, can be made to specifically exclude the use of pre-polymerized and/or isolated/purified polymer particles not only between stages of sequential polymerization but also prior to the first stage of sequential polymerization. For instance, the latex polymers according to the invention may contain substantially no pre-polymerized and/or isolated/purified polymer particles.

Typically, neither the core monomers nor the shell monomers of the acrylic polymer particles contain any crosslinking monomers or crosslinking agents. This is at least partially due to the fact that the polymer particles according to the invention are typically polymerized in a latex system, which can either stand alone or which can then be combined with other components to form compositions for particular applications. In one embodiment, the latex containing the polymer particles can be used in architectural coatings and paint formulations. In another embodiment, the latex can be combined with one or more colorants in hydrophobic latex applications.

In another aspect of the invention, the polymeric latex can be included in a paint composition, which can advantageously be an emulsion further containing water, a coalescence solvent, a pH adjustor, a surfactant, a defoamer, a pigment, optionally but preferably a dispersant, optionally but preferably a rheology modifier, and optionally but preferably a biocide or preservative.

Examples of coalescence solvents and organic solvents useful in the compositions according to the invention can include, but are not limited to, 2-ethylhexyl ether of ethylene glycol (e.g., commercially available as Eastman™ EEH solvent from Eastman Chemical), methyl carbitol, propylene glycol, ethylene glycol, those compounds sold under the tradename TEXANOL™ from Eastman Chemical, plasticizers such as dibutyl phthalate, and the like, and combinations thereof.

Examples of defoamers useful in the paint compositions according to the invention can include, but are not limited to, polysiloxane-polyether copolymers such as those sold by Tego under the tradename Foamex™, those sold by Byk Chemie under the tradename BYK™, those sold under the tradename Drewplus™ from Ashland Specialty Chemical, those sold under the tradename Surfynol™ from Air Products, and the like, and combinations thereof.

Examples of anticorrosive agents useful in the paint compositions according to the invention can include, but are not limited to, sodium nitrite and the like.

Examples of dispersants useful in the compositions according to the invention can include, but are not limited to, 2-amino-2-methyl-1-propanol, hydrophobic copolymers such as Tamol™ 165A commercially available from BASF, and combinations thereof.

Examples of rheology modifiers useful in the paint compositions according to the invention can include, but are not limited to, those commercially available from Rohm & Haas under the tradename Acrysol™, such as RM-2020 NPR and RM-825.

While typically multiple pigments/colorants are present in end-use latexes that are to be used in paint or architectural coating applications, sometimes only a white pigment, such as a zinc oxide and/or a titanium oxide, is added in the early stages of the formation of the paint composition (e.g., in the base composition). In such a case, any other desired pigments/colorants of various colors (including more white pigment) can optionally be added at the later stages of, or after, formation of the paint composition. Examples of pigments/colorants useful according to the invention can include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions according to the invention.

Additionally or alternately, extender pigments/colorants can be added, e.g., to the grind composition portion of the paint composition. Examples of extender pigments/colorants useful in the paint compositions according to the invention can include, but are not limited to, silica, silicates, carbonates such as calcium carbonates, and the like, and combinations thereof.

When conventional paint compositions containing acrylic-based latexes are applied to chalky substrates, for example, they can tend to exhibit poor adhesion to the chalky surface. In some cases, alkyd resins are combined with these poorly-adhering acrylic-based latex-containing paint compositions to improve the wet and/or dry adhesion properties. Alkyd resins, however, may negatively affect certain qualities of the paint compositions, including, but not limited to, causing loss of gloss, causing yellowing, causing color fading, causing chalkiness, causing brittleness, hindering clean-up, decreasing emulsion stability (thus increasing the need for added surfactant), increasing sensitivity to water, and the like, and combinations thereof.

The use of acrylic latexes containing multimodal molecular weight distributions according to the invention in paint compositions applied on chalky substrates can advantageously reduce or eliminate the need for incorporating alkyd resins. Without being bound by theory, it is believed that the presence of and/or increase in chains of the lower molecular weight fraction in the acrylic latex polymer particles can sufficiently improve the adhesion of paint compositions containing them to chalky substrates. Nevertheless, because uniformly lower molecular weight polymer particles can tend to compromise the physical and mechanical properties of the paint compositions and/or the surfaces of the chalky substrates coated therewith, it is also believed that a multimodal molecular weight distribution can simultaneously result in acceptable adhesion and acceptable physical/mechanical properties.

The paint compositions containing the sequentially polymerized polymer particles according to the invention can exhibit a wide range of viscosities, depending upon the application. In one embodiment, the viscosity of the sequentially polymerized latex can be from about 65 to about 130 Krebunits (KU), preferably from about 70 to about 110 KU, more preferably from about 75 to about 105 KU. While coalescence, degradation, and other factors can cause the viscosity to increase over time, it is preferable that the viscosity not increase beyond about 130 KU, preferably not beyond about 120 KU, more preferably not beyond about 115 KU, and in some cases not beyond about 110 KU.

The latexes and/or paint compositions containing the polymer particles according to the invention can advantageously exhibit a pH from about 6 to about 10, although the pH needs only to be sufficient to maintain the stability of the particular latex and/or paint composition in combination with the surfactant(s) and other stabilizing components.

Whether in combination with a crosslinking composition, in a paint composition, or by itself, the acrylic latexes according to the invention are typically applied to a substrate. The substrate may or may not depend upon the product in which acrylic latex according to the invention is used. For example, when the acrylic latex is used in a stain composition, the substrate can typically be wood or the like. Examples of substrates can include, but are not limited to: wood, including natural wood, compressed particulate wood, faux or artificial wood, wood composites, and the like, and combinations thereof; metals, including metal alloys, metal composites, coated metals, metallic surfaces, and the like, and combinations thereof; ceramics, including metal oxides, metal nitrides, metal oxynitrides, metal sulfides, metal carbides, and the like, and combinations thereof, transparent and/or translucent substrates such as glasses, polycarbonates, acrylics, styrenics, and the like, and combinations thereof; polymers; woven and/or non-woven fabrics; chalky substrates; building materials such as sheet rock; and the like; and combinations thereof.

In another aspect of the invention, the latex containing the polymer particles according to the invention is advantageously created using a sequential polymerization method for the desired monomer(s) with the addition of a molecular weight control agent at one or more points during the polymerization to effectuate a multimodal molecular weight distribution in the polymer particles. In a preferred embodiment, the polymer particles in the latex have a bimodal or trimodal molecular weight distribution. As used herein, the terms "bimodal", "trimodal", and "multimodal", as related to molecular weight distributions should be understood to mean assortments of molecular weights that exhibit two, three, or multiple resolvable molecular weight peaks, respectively, when analyzed using conventional analysis methods known to those of skill in the art, e.g., size exclusion/gel permeation chromatography (SEC/GPC), other liquid chromatography methods such as HPLC, gas chromatography methods optionally in combination with other molecular weight determination methods, light scattering, mass spectrometry, XPS/ESCA, small ion mass spectrometry (SIMS), quantitative infrared spectroscopic methods (FTIR), viscosity-based methods such as using specific/inherent viscosities, and the like, and combinations thereof. As used herein, the term "resolvable", with respect to molecular weight peaks can mean either of two things: (1) that the peaks are preferably visually distinguishable, e.g., show two or more distinct, even if overlapping, peaks upon inspection of a chromatogram; or (2) less preferably, that the peaks are not visually distinguishable, but are distinguishable by standard peak-fitting techniques known to those of skill in the art and result in a peak molecular weight separation of at least about 25,000 Daltons between each peak, preferably at least about 50,000 Daltons between each peak, more preferably at least about 75,000 Daltons between each peak, most preferably at least about 100,000 Daltons between each peak.

A conventional acrylic latex polymerization typically involves a single charge of monomer that is introduced/emulsified, initiated, and polymerized to form acrylic polymer particles having a monomodal molecular weight distribution. On the other hand, a bimodal sequential latex polymerization according to the invention can involve the following: a first introduction, initiation, and polymerization of a first charge of monomer without any polymer molecular weight control agent to form a first modality of a molecular weight distribution; and, sequentially, a second introduction of a second charge of monomer, along with a second initiator and a polymer molecular weight control agent, and co-polymerization of that second charge of monomer, initiator, and polymer molecular weight control agent with the first charge to form a second modality of the molecular weight distribution. For multiple modalities other than bimodal, the repetition of the second sequential addition step of a third, etc., charge of monomer plus corresponding additional charges of initiator and polymer molecular weight control agent to form the remaining desired number of modalities of the molecular weight distribution. In a preferred embodiment, multimodal sequential latex polymerizations according to the invention can advantageously be made to specifically exclude actively manipulating, isolating, purifying, and/or separating the partially polymerized particles in/from the latex in between the first introduction and the second introduction, as well as between any of the other introductions of monomer, initiator, and polymer molecular weight control agent and/or even before the first introduction of monomer and initiator.

A multimodal sequential latex polymerization according to the invention can occur in the following manner. Initially, an aqueous surfactant solution containing water, a surfactant, optionally but preferably a pH adjusting agent, and optionally an organic solvent is placed in a reaction vessel and brought to a polymerization temperature. The polymerization temperature can be tailored to the particular initiators/monomers in the polymerization. For example, when sodium persulfate is used as the initiator for predominantly acrylic monomers, the polymerization temperature can be between about 70° C. and about 90° C., preferably between about 75° C. and about 85° C., for example about 80° C. When the surfactant solution and the reaction vessel are at temperature, a seed amount of a first emulsion containing water, a surfactant, a monomer containing a pendant functional group, a diluent monomer, and optionally a pH adjustor can then be added. A seed amount of a first monomer emulsion can then be added to the emulsion. In combination with the addition of a first initiator solution, the seed amount of monomer should be sufficient to allow the polymerization to begin. In one embodiment, the seed amount can represent about 1% to about 10%, for example from about 2% to about 8%, of the weight of the first emulsion. Typically, the proportion of monomers added in this first emulsion can advantageously represent the desired composition of the polymer particles and can thus advantageously have a substantially similar proportion of monomers as those in all other emulsions of monomer subsequently added to the reaction vessel.

Typically, a short period of time such as about 15 minutes, is allowed for the initiator solution and the monomer emulsion to reach the polymerization temperature and to for polymerization to begin. Thereafter, the remainder of the first emulsion can be added to the reaction vessel, either continuously or in multiple sequential charges, along with a portion of second solution containing water and initiator. The first emulsion can advantageously contain at least about 25 wt %, preferably at least about 45 wt %, more preferably at least about 60 wt %, for example at least about 75 wt % of the total monomer content. The first emulsion can also advantageously contain no more than about 90 wt %, preferably no more than about 85 wt %, more preferably no more than about 80 wt % of the total monomer content. The portion of the second initiator solution added with the first emulsion can advantageously represent a similar percentage of the entire second initiator solution as the portion of the first emulsion compared to the total monomer content. In other words, if the first emulsion is about 75% by weight of the total monomer content, then the portion of the second initiator solution can typically represent about 75% by weight of the entire second initiator solution.

When all of the first emulsion has been added, sequentially and preferably immediately thereafter, a second monomer emulsion is co-added with a polymer molecular weight control agent solution and the remainder of the second initiator solution. As used herein, the term "immediately," at least in relation to the occurrence of two actions in a chemical process, should be understood to mean that the two actions occur temporally within seconds of each other or within a reasonably small amount of time, and without any intervening actions, so as to have little or substantially no effect on the outcome of the chemical process.

The second monomer emulsion contains water, a surfactant, at least one monomer with a pendant functional group, a diluent monomer, and optionally a pH adjustor; the second emulsion typically and preferably contains substantially the same proportion of functional and diluent monomers as in the first emulsion. The rates of addition of the first and second emulsions, the polymer molecular weight control agent, and the second initiator solution can advantageously be tailored to be appropriate to the reaction conditions and the nature of the reactants in the polymerization. Nevertheless, the rate of addition of the second emulsion and polymer molecular weight control agent solution can typically be similar to that of the first emulsion and second initiator solution. In one embodiment, the sequential addition of the monomer emulsions can occur for a period of about 1 to about 5 hours, preferably from about 2 to about 4 hours. After the additions of monomer and initiator have ended, a sufficient polymerization time is allowed. This polymerization time can be, in one embodiment, from about ½ hour to about 2 hours, for example about 1 hour.

After the polymerization has run its course, the temperature of the reaction vessel can advantageously be decreased to, e.g., between about 40° C. and about 70° C., preferably between about 50° C. and about 65° C., for instance about 60° C. Thereafter, the contents of the reaction vessel can optionally be rinsed with water. Then, preferably, a chaser solution containing water, a redox system comprising, separately, an oxidizing agent and a reducing agent, optionally a surfactant, and optionally a pH adjusting agent can be added to the reaction vessel. The chaser solution(s) can be added in one charge or, in one embodiment, over a period of time ranging from about 10 minutes to about 90 minutes, preferably from about 15 minutes to about 60 minutes, for example about ½ hour. The primary purpose of the chaser solution(s), when present, is to react with, and thus devolatilize, any residual monomers and/or low molecular weight oligomers from the polymerization. Following the optional addition of the chaser solution(s), an additive solution containing water and a pH adjustor and/or a biocide/preservative can optionally be added to the reaction vessel to help stabilize the latex emulsion. A coalescence solvent may optionally be added at a later stage.

After a sufficient period of time, e.g., from about 5 minutes to about 60 minutes, preferably from about 5 minutes to about 45 minutes, for example about 15 minutes, the temperature of the reaction vessel can again advantageously be decreased to, e.g., between about 20° C. and about 45° C., preferably between about 25° C. and about 40° C., for example about 30° C. Thereafter, the latex containing the polymer particles according to the invention can be actively manipulated, isolated, purified, and/or separated, if desired, e.g., by filtration through a mesh screen to limit the maximum polymer particle diameter. In one embodiment, the filtration can occur through a mesh screen of about 50 mesh to about 250 mesh, preferably of about 100 mesh to about 200 mesh, for example of about 150 mesh.

In one embodiment, a paint composition containing latex particles according to the invention can be formulated according to the following method. First, a pigment dispersion composition, or grind, is formed by: combining an organic solvent, water, a dispersant, a pH adjustor, a surfactant, a defoamer, a colorant/pigment, and a biocide/preservative; stirring and optionally grinding for a period of time to sufficiently mix the ingredients; and, while continuing to stir and/or grind, adding more water. To this pigment dispersion composition can be added a latex containing sequentially polymerized polymer particle according to the invention, followed by a pH adjustor, if desired, and a performance additive composition comprising an organic solvent, a surfactant, and a defoamer. Optionally but preferably, an anticorrosive solution can then be added. Then, a rheology modifier can be added, optionally including more water, if desired, and also a pH adjustor, thus forming a paint composition. Furthermore, if desired, more colorant(s) and/or pigment(s) can be added to the paint composition either to compliment the (white) pigment(s)/colorant(s) already in the pigment dispersion composition or to add another desired color to the paint composition. A coalescence solvent may optionally be added later.

EXAMPLES

The following Examples are merely illustrative of certain embodiments of the invention and contain comparisons of compositions and methods according to the invention with the prior art and/or embodiments not according to the invention. The following Examples are not meant to limit the scope and breadth of the present invention, as recited in the appended claims.

Example 1

Latex Containing Polymer Particles According to the Invention

Example 1 describes an acrylic latex with polymer particles in which isooctyl mercaptopropionate was added as a chain transfer agent. The acrylic latex polymer particles exhibited a total $M_n$ of about 28,400 Daltons, a total $M_w$ of about 224,000 Daltons, and thus a polydispersity index (PDI, or $M_w/M_n$) of about 7.89. The acrylic latex polymer particles also exhibited a bimodal polymer molecular weight distribution with an $M_p^L$ of about 30,000-35,000 Daltons and a $M_p^H$ of about 290,000-325,000 Daltons. When analyzed separately, the low molecular weight peak in Example 1 was found to have a $M_n$ of about 15,700 Daltons and an $M_w$ of about 30,900 Daltons, and the high molecular weight peak in Example 1 was found to have a $M_n$ of about 238,000 Daltons and an $M_w$ of about 395,000 Daltons.

These molecular weight values were obtained by analyzing the acrylic latex polymer particles using a GPC having an Agilent 1100 Refractive Index Detector, tetrahydrofuran (THF) as the mobile phase at ambient temperature (e.g., about 20-35° C.), a flow rate of about 0.75 mL/min through three Polymer Laboratories Linear Mixed-B columns, an injection volume of about 100 μL, and a solution concentration of about 0.2 wt % polymer dissolved in THF, previously filtered through 0.45-μm PTFE filters.

The latex composition, in order of addition, is described below in Table 1.

TABLE 1

| Ingredients | Amount (grams) | Monomer content |
|---|---|---|
| Aqueous Surfactant Solution | | |
| water | 500 | |
| sodium bicarbonate pH adjustor | 1.3 | |
| RHODACAL ™ A246/LC surfactant | 2.2 | |
| Total Monomer Emulsion* | | |
| water | 400 | |
| methyl methacrylate monomer | 518 | 45.1 wt % |
| butyl acrylate monomer | 597 | 52 wt % |
| methacrylic acid monomer | 7.0 | 0.6 wt % |
| SIPOMER ™ WAM-II monomer | 26 | 2.3 wt % |
| RHODACAL ™ A246/LC surfactant | 16 | |
| RHODAFAC ™ RS-610 A-25 surfactant | 45 | |
| ammonia (26% in water) pH adjustor | 2.0 | |
| First Initiator Solution | | |
| water | 10 | |
| sodium persulfate initiator | 2.4 | |
| Polymer Molecular Weight Control Agent | | |
| isooctyl mercaptopropionate (IOMP) | 6.0 | |
| Second Initiator Solution | | |
| water | 30 | |
| sodium persulfate initiator | 0.5 | |
| Chaser Solutions | | |
| sodium formaldehyde sulfoxylate reducer | 1.4 | |
| water | 10 | |
| t-butyl hydroperoxide oxidizer | 2.4 | |
| water | 30 | |

*The first monomer emulsion comprised about 1200 grams of the about 1600 total grams of the total monomer emulsion. Of the about 1200 grams in the first monomer solution, about 60 grams was used as the seed amount.

Example 2

Latex Containing Polymer Particles According to the Invention

Example 2 describes an acrylic latex with polymer particles in which isooctyl mercaptopropionate was added as a chain transfer agent. The acrylic latex polymer particles exhibited a total $M_n$ of about 34,800 Daltons, a total $M_w$ of about 175,000 Daltons, and thus a polydispersity index (PDI, or $M_w/M_n$) of about 5.03. The acrylic latex polymer particles also exhibited a bimodal polymer molecular weight distribution with an $M_p^L$ of about 36,000-43,000 Daltons and a $M_p^H$ of about 230,000-255,000 Daltons. When analyzed separately, the low molecular weight peak in Example 2 was found to have a $M_n$ of about 19,000 Daltons and an $M_w$ of about 37,800 Daltons, and the high molecular weight peak in Example 2 was found to have a $M_n$ of about 237,000 Daltons and an $M_w$ of about 342,000 Daltons.

These molecular weight values were obtained by analyzing the acrylic latex polymer particles using a GPC having an Agilent 1100 Refractive Index Detector, tetrahydrofuran (THF) as the mobile phase at ambient temperature (e.g., about 20-35° C.), a flow rate of about 0.75 mL/min through three Polymer Laboratories Linear Mixed-B columns, an injection volume of about 100 μL, and a solution concentration of about 0.2 wt % polymer dissolved in THF, previously filtered through 0.45-μm PTFE filters.

The latex composition, in order of addition, is described below in Table 2.

TABLE 2

| Ingredients | Amount (grams) | Monomer content |
|---|---|---|
| Aqueous Surfactant Solution | | |
| water | 300 | |
| sodium bicarbonate pH adjustor | 1 | |
| RHODACAL ™ A246/LC surfactant | 0.7 | |
| Total Monomer Emulsion* | | |
| water | 240 | |
| n-butyl methacrylate monomer | 669 | 96.3 wt % |
| methacrylic acid monomer | 4.2 | 0.6 wt % |
| SIPOMER ™ WAM-II monomer | 21.6 | 3.1 wt % |
| RHODACAL A246/LC surfactant | 25 | |
| ammonia (26% in water) pH adjustor | 3.0 | |
| First Initiator Solution | | |
| water | 6 | |
| sodium persulfate initiator | 1.4 | |
| Polymer Molecular Weight Control Agent | | |
| isooctyl mercaptopropionate (IOMP) | 3.6 | |
| Second Initiator Solution | | |
| water | 18 | |
| sodium persulfate initiator | 0.3 | |
| Chaser Solutions | | |
| sodium formaldehyde sulfoxylate reducer | 0.9 | |
| water | 6 | |
| t-butyl hydroperoxide oxidizer | 1.5 | |
| water | 18 | |

*The first monomer emulsion comprised about 480 grams of the about 960 total grams of the total monomer emulsion. Of the about 480 grams in the first monomer solution, about 45 grams was used as the seed amount.

Comparative Example 1

Latex Containing Acrylic Polymer Particles without Polymer Molecular Weight Control Agents Comparative Example 1 describes an acrylic latex having polymer particles with a monomodal molecular weight distribution and without any added polymer molecular weight control agents. The acrylic latex polymer particles exhibited a total $M_n$ of about 47,200 Daltons, a total $M_w$ of about 140,000 Daltons, and thus a polydispersity index (PDI, or $M_w/M_n$) of about 2.97. The acrylic latex polymer particles also exhibited a monomodal polymer molecular weight distribution with a single peak molecular weight, $M_p$, of about 146,000 Daltons.

These molecular weight values were obtained by analyzing the acrylic latex polymer particles using a GPC having an Agilent 1100 Refractive Index Detector, tetrahydrofuran (THF) as the mobile phase at ambient temperature (e.g., about 20-35° C.), a flow rate of about 0.75 mL/min through three Polymer Laboratories Linear Mixed-B columns, an injection volume of about 100 μL, and a solution concentration of about 0.2 wt % polymer dissolved in THF, previously filtered through 0.45-μm PTFE filters.

The latex composition, in order of addition, is described below in Table 3.

TABLE 3

| Ingredients | Amount (grams) | Monomer content |
|---|---|---|
| Aqueous Surfactant Solution | | |
| water | 570 | |
| sodium bicarbonate pH adjustor | 3.5 | |
| RHODACAL ™ A246/LC surfactant | 2.5 | |
| Total Monomer Emulsion* | | |
| water | 421 | |
| methyl methacrylate monomer | 513 | 42.7 wt % |
| butyl acrylate monomer | 639 | 53.3 wt % |
| methacrylic acid monomer | 12.5 | 1.0 wt % |
| SIPOMER ™ WAM-II monomer | 35 | 2.9 wt % |
| RHODACAL ™ A246/LC surfactant | 15.5 | |
| TRITON ™ QS-44 surfactant | 16.3 | |
| IGEPAL ™ CO-897 surfactant | 2.0 | |
| IGEPAL ™ CO-710 surfactant | 5.5 | |
| ammonia (26% in water) pH adjustor | 13.0 | |
| First Initiator Solution | | |
| water | 25 | |
| sodium persulfate initiator | 1.2 | |
| Second Initiator Solution | | |
| water | 55 | |
| sodium persulfate initiator | 2.8 | |
| Chaser Solutions | | |
| sodium formaldehyde sulfoxylate reducer | 1.7 | |
| water | 10 | |
| t-butyl hydroperoxide oxidizer | 1.4 | |
| water | 10 | |

*Of the about 1670 grams in the monomer solution, about 100 grams was used as the seed amount.

Example 3 and Comparative Example 2

Chalk Binding Behavior of Paint Compositions Containing Multimodal and Monomodal Latex Polymer Particles Example 3 shows the chalk binding behavior of a variety of paint compositions, each comprising multimodal acrylic latex polymer particles, such as in Example 1. Comparative Example 2 shows the chalk binding behavior of a variety of paint compositions, each comprising a corresponding monomodal acrylic latex, such as in Comparative Example 1.

Chalk binding tests are typically performed through exterior exposures of chalky panels top-coated with paint samples applied by brush or by draw down coating. Panels are usually then exposed on a test fence for a specified period of time. Periodic ratings are then performed to evaluate cracking and peeling performance.

In this case, western red cedar panels were coated with paint that had chalked to a rating of about 5, using test conditions specified under ASTM D3359. Various 3-mil thick draw down coatings of paint compositions were applied to these panels and let dry overnight, for about 7 days, and for about 14 days. After drying, wet and dry adhesion of the paint coatings were evaluated using Scotch™ 600 tape and a 6×6 cross-hatch adhesion standard test, as detailed in ASTM D3359 Method B. For wet adhesion, the coated panels were placed in 100% humidity for about 1 hour and were blotted dry prior to the cross-hatch test. The adhesion ratings range from 0B through 5B, based on the relative percent area of flaking/peeling within the 6×6 cross-hatch area. 5B=no flaking; 4B=less than 5% flaking; 3B=5-15% flaking; 2B=15-35% flaking; 1B=35-65% flaking; 0B=more than 65% flaking.

Dry and wet scratch resistance tests were also performed on these panels by scratching the coated substrates with a fingernail, after they had been prepared for dry and wet adhesion testing, respectively. Passing these tests involved the coatings having substantially no scratching (e.g., not more than about 5%, based on scratching length and/or surface area n the coating), including substantially no delamination from the substrate (e.g., not more than about 10%, based on coating surface area), upon gentle scratching via a fingernail. The results of all these tests are shown below in Table 4.

TABLE 4

| Example # | Dry Chalk Bind | Wet Chalk Bind. | Dry Scratch-Resist. | Wet Scratch-Resist. |
|---|---|---|---|---|
| 3A# | 5B | 5B | pass | pass |
| 3B | 5B | 5B | pass | pass |
| 3C | 5B | 4B | pass | pass |
| 3D | 5B | 4B | pass | pass |
| 3E | 5B | 5B | pass | pass |
| 3F | 5B | 4B | pass | pass |
| Comp. 2A | 5B | 0B | pass | soft-fail |
| Comp. 2B* | 5B | 0B | pass | soft-fail |
| Comp. 2C* | 5B | 0B | pass | soft-fail |

Flat paint;
*Primer

As can be seen from the results above, the relative molecular weight distributions of the polymer particles did not seem to affect the dry chalk binding or dry scratch resistance properties of the paints. However, regarding wet chalk binding and wet scratch resistance, the paint compositions of Examples 3A-3F containing acrylic latex particles having a bimodal molecular weight distribution performed much better than the paint and primer compositions of Comparative Examples 2A-2C acrylic latex particles having a monomodal molecular weight distribution.

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. An acrylic latex composition comprising polymer particles that have a multimodal molecular weight distribution comprising at least a first, distinct, lower molecular weight peak and a second, distinct, higher molecular weight peak, wherein:
   the polymer particles have a total number average molecular weight of not more than about 60,000 Daltons, a total weight average molecular weight of not less than about 150,000 Daltons, and a total polydispersity of at least about 3.1;
   the first, distinct, higher molecular weight peak has a peak molecular weight from about 175,000 Daltons to about 400,000 Daltons;
   the second, distinct, lower molecular weight peak has a peak molecular weight from about 15,000 Daltons to about 60,000 Daltons;
   the ratio of the peak molecular weights between the first peak and the second peak is from about 3:1 to about 30:1; and
   the polymer particles:
      (i) are substantially free from hydroxy-functional monomer repeat units and conjugated diene monomer repeat units;
      (ii) comprise substantially acrylic monomers; or
      (iii) both (i) and (ii).

2. The acrylic latex of claim 1, wherein the polymer particles comprise the following monomer repeat units: acrylic acid, alkacrylic acid, or both; an alkyl acrylate; and an alkyl alkacrylate.

3. The acrylic latex of claim 1, wherein the multimodal molecular weight distribution is bimodal or trimodal.

4. The acrylic latex of claim 2, wherein the multimodal molecular weight distribution is bimodal.

5. The acrylic latex of claim 1, wherein the total number average molecular weight is not more than about 45,000 Daltons, the total weight average molecular weight is not less than about 170,000 Daltons, and the total polydisperity is at least about 5.

6. The acrylic latex of claim 1, wherein the first molecular weight peak has a peak molecular weight from about 200,000 Daltons to about 375,000 Daltons, the second molecular weight peak has a peak molecular weight from about 20,000 Daltons to about 50,000 Daltons, and the ratio of the peak molecular weights between the first peak and the second peak is from about 4:1 to about 20:1.

7. The acrylic latex of claim 5, wherein the first molecular weight peak has a peak molecular weight from about 200,000 Dalton to about 375,000 Daltons, the second molecular weight peak has a peak molecular weight from about 20,000 Daltons to about 50,000 Daltons, and the ratio of the peak molecular weights between the first peak and the second peak is from about 4:1 to about 20:1.

8. The acrylic latex of claim 2, wherein:
   the multimodal molecular weight distribution is bimodal;
   the total number average molecular weight is not more than about 45,000 Daltons;
   the total weight average molecular weight is not less than about 170,000 Daltons;
   the total polydispersity is at least about 5;
   the first molecular weight peak has a peak molecular weight from about 200,000 Daltons to about 375,000 Daltons;
   the second molecular weight peak has a peak molecular weight from about 20,000 Daltons to about 50,000 Daltons; and
   the ratio of the peak molecular weights between the first peak and the second peak is from about 4:1 to about 20:1.

9. A wood stain composition comprising the acrylic latex of claim 1.

10. The wood stain of claim 9, which is substantially free from alkyd resin.

11. A paint composition comprising:
   the acrylic latex of claim 1;
   water;
   a coalescence solvent;
   a pH adjustor;
   a surfactant;
   a defoamer;
   a pigment;
   optionally a dispersant;
   optionally a rheology modifier; and
   optionally a preservative.

12. The acrylic latex of claim 1, wherein the acrylic latex, when coated on a substrate in accordance with ASTM D3359, exhibits a method B wet chalk binding rating of 4B or 5B.

13. The acrylic latex of claim 12, wherein the polymer particles are also substantially free from acrylonitrile and alkacrylonitrile monomer repeat units.

14. The acrylic latex of claim 12, wherein the polymer particles comprise substantially acrylic monomers.

15. The acrylic latex of claim 12, wherein the multimodal molecular weight distribution is bimodal or trimodal.

16. The acrylic latex of claim 14, wherein the multimodal molecular weight distribution is bimodal.

17. The acrylic latex of claim 12, wherein the acrylic latex composition, when coated on a substrate, exhibits substantially no scratching and substantially no delamination under both dry and wet scratch fingernail resistance test conditions.

18. The acrylic latex of claim 12, wherein the total number average molecular weight is not more than about 45,000 Daltons, the total weight average molecular weight is not less than about 170,000 Daltons, and the total polydispersity is at least about 5.

19. The acrylic latex of claim 12, wherein the first molecular weight peak has a peak molecular weight from about 200,000 Daltons to about 375,000 Daltons, the second molecular weight peak has a peak molecular weight from about 20,000 Daltons to about 50,000 Daltons, and the ratio of the peak molecular weights between the first peak and the second peak is from about 4:1 to about 20:1.

20. The acrylic latex of claim 18, wherein the first molecular weight peak has a peak molecular weight from about 200,000 Daltons to about 375,000 Daltons, the second molecular weight peak has a peak molecular weight from about 20,000 Daltons to about 50,000 Daltons, and the ratio of the peak molecular weights between the first peak and the second peak is from about 4:1 to about 20:1.

21. The acrylic latex of claim 14, wherein:
   the polymer particles comprise the following monomer repeat units: acrylic acid, an alkacrylic acid, or both; an alkyl acrylate; and an alkyl alkacrylate;
   the multimodal molecular weight distribution is bimodal;
   the total number average molecular weight is not more than about 45,000 Daltons;
   the total weight average molecular weight is not less than about 170,000 Daltons;
   the total polydispersity is at least about 5;
   the first molecular weight peak has a peak molecular weight from about 200,000 Daltons to about 375,000 Daltons;

the second molecular weight peak has a peak molecular weight from about 20,000 Daltons to about 50,000 Daltons; and the ratio of the peak molecular weights between the first peak and the second peak is from about 4:1 to about 20:1.

22. A wood stain composition comprising the acrylic latex of claim 12.

23. The wood stain of claim 22, which is substantially free from alkyd resin.

24. A paint composition comprising:

the acrylic latex of claim 12;

water;

a coalescence solvent;

a pH adjustor;

a surfactant;

a defoamer;

a pigment;

optionally a dispersant;

optionally a rheology modifier; and optionally a preservative.

25. A substrate having a chalky surface that is coated with the acrylic latex of claim 12.

* * * * *